United States Patent [19]

O'Rourke et al.

[11] Patent Number: 5,348,396
[45] Date of Patent: Sep. 20, 1994

[54] METHOD AND APPARATUS FOR OPTICAL TEMPERATURE MEASUREMENT

[75] Inventors: Patrick E. O'Rourke, Martinez, Ga.; Ronald R. Livingston, Aiken, S.C.; William S. Prather, Augusta, Ga.

[73] Assignee: The United States of America as represented by the United States Department of Energy, Washington, D.C.

[21] Appl. No.: 979,672

[22] Filed: Nov. 20, 1992

[51] Int. Cl.$^5$ .......................................... G01K 11/00
[52] U.S. Cl. ................................. 374/161; 374/130; 364/557
[58] Field of Search ............... 364/557; 374/131, 130, 374/161, 208; 356/43, 44; 250/227.18, 227.23

[56] References Cited

U.S. PATENT DOCUMENTS

| Re. 31,832 | 2/1985 | Samulski | 374/131 |
|---|---|---|---|
| 4,075,493 | 2/1978 | Wickersheim | 250/461 |
| 4,081,215 | 3/1978 | Penney et al. | 356/45 |
| 4,215,275 | 7/1980 | Wickersheim | 250/459 |
| 4,223,226 | 9/1980 | Quick et al. | 250/458 |
| 4,302,970 | 12/1981 | Snitzer et al. | 73/339 |
| 4,374,328 | 2/1983 | Tekippe et al. | 250/458 |
| 4,448,547 | 5/1984 | Wickersheim | 374/131 |
| 4,462,699 | 7/1984 | Shaw et al. | 374/131 |
| 4,560,286 | 12/1985 | Wickersheim et al. | 374/131 |
| 4,592,664 | 6/1986 | Bijlenga et al. | 374/131 |
| 4,626,110 | 12/1986 | Wickersheim et al. | 374/131 |
| 4,669,872 | 6/1987 | Ida | 356/43 |
| 4,673,299 | 6/1987 | Dakin | 374/131 |
| 4,679,157 | 7/1987 | Hirano et al. | 364/557 |
| 4,703,175 | 10/1987 | Salour et al. | 250/227 |
| 4,708,494 | 11/1987 | Kleinerman | 374/161 |
| 4,729,668 | 3/1988 | Angel et al. | 374/161 |
| 4,767,219 | 8/1988 | Bibby | 374/123 |
| 4,778,270 | 10/1988 | Kinney et al. | 374/161 X |
| 4,790,669 | 12/1988 | Christensen | 374/131 |
| 4,823,166 | 4/1989 | Hartog et al. | 356/44 |
| 4,830,513 | 5/1989 | Grego | 374/131 |
| 4,845,647 | 7/1989 | Dils et al. | 364/557 |
| 4,986,671 | 1/1991 | Sun et al. | 374/161 X |
| 5,183,338 | 2/1993 | Wickersheim et al. | 374/131 |

FOREIGN PATENT DOCUMENTS 2140554 11/1984 United Kingdom .
2170594 8/1986 United Kingdom .

OTHER PUBLICATIONS

Fernandez, Manahen and Glenn Bastiaans, "A New Approach to Spatially Resolved Flame Temperature Measurements", Nov. 2, 1979, vol. 33, pp. 145–150 *Applied Spectroscopy.*

*Primary Examiner*—William A. Cuchlinski, Jr.
*Assistant Examiner*—G. Bradley Bennett
*Attorney, Agent, or Firm*—Brian R. Tumm; Harold M. Dixon; William R. Moser

[57] ABSTRACT

A temperature probe and a method for using said probe for temperature measurements based on changes in light absorption by the probe. The probe comprises a first and a second optical fiber that carry light to and from the probe, and a temperature sensor material, the absorbance of which changes with temperature, through which the light is directed. Light is directed through the first optical fiber, passes through the temperature sensor material, and is transmitted by a second optical fiber from the material to a detector. Temperature-dependent and temperature-independent factors are derived from measurements of the transmitted light intensity. For each sensor material, the temperature T is a function of the ratio, R, of these factors. The temperature function f(R) is found by applying standard data analysis techniques to plots of T versus R at a series of known temperatures. For a sensor having a known temperature function f(R) and known characteristic and temperature-dependent factors, the temperature can be computed from a measurement of R. Suitable sensor materials include neodymium-doped borosilicate glass, accurate to ±0.5° C. over an operating temperature range of about −196° C. to 400° C.; and a mixture of $D_2O$ and $H_2O$, accurate to ±0.1° C. over an operating range of about 5° C. to 90° C.

20 Claims, 5 Drawing Sheets

METHOD AND APPARATUS FOR OPTICAL TEMPERATURE MEASUREMENT

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to optical temperature measurement. In particular, the present invention relates to a method and apparatus for measuring temperature by analyzing temperature-dependent changes in light transmission through temperature-sensitive materials.

2. Discussion of Background

Measurement and control of temperature are important in many industrial, medical, household, and research applications. Temperature monitoring and control systems are found in nuclear reactor vessels and coolant systems, treatment facilities for administration of chemotherapy or radiotherapy, conventional and microwave ovens, and various industrial processes. Temperature is often monitored at underground nuclear waste-disposal sites, chemical dumping sites, geothermal wells, and the like. Temperature measurements in hazardous or inaccessible locations must be carried out remotely. Remote measurements are indicated in regions having high radiation levels, high intensity electric or magnetic fields, high pressures and temperatures, toxic gases, corrosive materials or the like.

Temperature measurements can be made with well-known devices such as thermocouples, thermistors, resistance thermometers and the like. These devices contain electrically-conducting components that generate temperature-dependent electrical signals. The signals are amplified and converted into temperature readings or used in control functions. Such devices often give erroneous readings due to electrical interference problems. The devices are subject to field perturbation effects when used in the presence of electromagnetic fields such as those produced by electric motors, generators, power cables and the like. Some of these devices present safety hazards to personnel because of possible high voltages induced or conducted from high voltage sources. In addition, some devices are subject to degradation in severe operating environments.

Many of these problems can be overcome by using remote, in situ optical sensors coupled to a detector by optical fibers. Optical sensors contain essentially no metallic or electrically-conducting components. Optical fibers are durable, corrosion-resistant, heat-resistant, and impervious to electrical or magnetic interference. The fibers allow remote monitoring of sensors in inaccessible and/or hazardous locations. In addition, signals can be transmitted over optical fibers with low attenuation and without prior conversion or conditioning. The information-carrying capacity of optical fibers is greater and less subject to interference than that of electrical cables. The signals can be multiplexed so that a single light source and a single light detector can be used for measuring the outputs of many remote sensors.

Many types of optical temperature sensor are available. Several devices use optical time-domain reflectometry (OTDR) techniques to measure temperature (Grego, U.S. Pat. No. 4,830,513; Hartog et al, U.S. Pat. Nos. 4,823,166; 4,767,219; Bibby, GB Patent No. 2,170,594; Dakin, GB Patent No. 2,140,554). Other sensors measure temperature-dependent changes in the absorption spectra of materials such as GaAs, CdTe, and CdS (Christensen, U.S. Pat. No. 4,790,669; Ida, U.S. Pat. No. 4,669,872; Salour, et al., U.S. Pat. No. 4,703,175), and temperature-dependent absorption in neodymium-doped glass (Kleinerman, U.S. Pat. No. 4,708,494; Dakin, U.S. Pat. No. 4,673,299; Snitzer et al., U.S. Pat. No. 4,302,970).

The fluorescence intensities of glasses or ceramics doped with neodymium (Angel, et al., U.S. Pat. No. 4,729,668; Bijlenga et al., U.S. Pat. No. 4,592,664) and lithium neodymium phosphate (Hirano et al., U.S. Pat. No. 4,679,157) are used for temperature measurements. Sensors based on temperature-dependent fluorescent or phosphorescent properties of materials include a device for measuring the intensity ratio of two distinct and optically-isolatable fluorescent emission lines of selected rare earth-doped compounds (Wickersheim, U.S. Pat. Nos. 4,448,547; 4,560,286; 4,215,275; 4,075,493).

All of these techniques are subject to inaccuracy caused by poor resolution, drift, variable optical losses in the transmitting fibers, difficulties in measuring light transmission through an optical fiber undergoing changes in temperature, and limited temperature ranges. The measurements may be affected by thermal expansion/contraction of the probe materials, so each probe must be individually calibrated before use. There is a need for an inexpensive optical temperature sensor method and apparatus that provides accurate, reproducible data over a broad temperature range without the need for extensive calibration procedures.

SUMMARY OF THE INVENTION

According to its major aspects and broadly stated, the present invention is an optical temperature probe and a method for using the probe. The probe bears a sensor with temperature-dependent light-absorbing properties. The sensor is in optical communication with a source of light and a detector such as a spectrophotometer. A characteristic factor and a temperature-dependent factor are derived from measurements of the amount of light transmitted through the sensor by analyzing the change in the absorbance characteristics of the sensor material with changes in temperature. The factors themselves are subject to the sources of inaccuracy described above. Surprisingly, however, the ratio R of the temperature-dependent factor to the characteristic factor correlates closely to the temperature That is, $T = f(R)$, where T is the temperature and $f(R)$ is a function of R.

The temperature function $f(R)$ for a particular sensor material is found by applying standard curve-fitting techniques to plots of R versus T at a series of known temperatures. Once the temperature-dependent factor, the characteristic factor, and $f(R)$ for the material are known, an unknown temperature is found by placing the probe in the region of interest, computing R from measurements of the light transmitted through the material, and computing T from $f(R)$.

An important feature of the present invention is the temperature sensor. The sensor is connected to a source of light by a first optical fiber and to a detector by a second optical fiber. The sensor is made of a material having a temperature function $f(R)$, where R is the ratio of temperature-dependent and characteristic factors derived from measurements of the amount of light transmitted through the material. The choice of temperature-sensing materials depends on the desired temperature range and sensitivity of the measurement, and the physical conditions expected at the location. The sensor is preferably made of substantially non-electrically-conducting materials to minimize electrical interference when used in electromagnetic fields and near sources of leakage current. Suitable sensor materials include glass doped with rare earths, such as neodymium or curopium, or fluids, such as a mixture of $D_2O$ and $H_2O$.

Another feature of the present invention is the temperature probe. The probe may be made of substantially non-electrically-conducting and non-thermally-conducting materials, minimizing the effects of stray electromagnetic fields, leakage currents, and thermal conductivity on the measurement.

Still another feature of the invention is the method for determining the temperature from measurements made with the probe. Characteristic and temperature-dependent factors for the sensor material are derived from its absorbance spectrum or from measurements of the transmitted light intensity at selected wavelengths (or narrow bands of wavelengths). The temperature is computed from the ratio R of these factors. The method largely eliminates the effects of probe-to-probe variations in materials, construction, geometry, and thermal expansion/contraction. Use of the method eliminates the need to calibrate each probe individually, thereby saving the considerable time and expense incurred in individually calibrating probes.

The temperature function $f(R)$ of a material may be computed from measurements of the absorbance spectrum at a series of known temperatures. The first derivative $S'$ of the absorbance spectrum is decomposed into two vector functions $C_1$ and $C_2$. $C_1$ represents the weighted average of a series of measurements over a range of temperatures, and $C_2$ represents the difference between each measurement and the weighted average. The absorbance ratio $R_{21}$ is given by $R_{21}=(S' \cdot C_2)/(S' \cdot C_1)$. The temperature is a unique function of $R_{21}$ for each particular material, found by a least squares fit of $R_{21}$ versus T at a series of known temperatures. For example, $T=f(R_{21})=AR_{21}+BR_{21}^2+C$ for neodymium-doped glass, where A, B, and C are constants. The temperature function of other materials may assume a similar form, or other forms including higher-order equations or other types of equation such as an exponential series. Once $f(R_{21})$ is known, an unknown temperature can be determined by the procedure described above.

Alternatively, a ratio may be derived from the transmitted light intensity at three selected wavelengths: $I_b$, at a first wavelength outside the characteristic range; $I_I$, at an isobestic wavelength; $I_A$, at an analytic point (a nonisobestic wavelength within the characteristic range). The ratio $R_{AI}$ is given by $A_A/A_I$, where $A_I = -\ln(I_I/I_b)$ and $A_A = -\ln(I_A/I_b)$. The temperature is a unique function of $R_{AI}$ for each particular material. For example, $T=f(R_{AI})=AR_{AI}+BR_{AI}^2+C$ for neodymium-doped glass, where A, B, and C are constants. The temperature function of other materials may assume a similar form, or other forms including higher-order equations or other types of equation such as an exponential series.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

The amount of light transmitted by many materials varies with temperature. This phenomenon is the basis for many of the optical temperature sensors discussed above. These types of sensor are subject to inherent inaccuracy caused by poor resolution, drift, variable optical losses in the transmitting fibers, thermal expansion/contraction of sensor components, and so forth. Each sensor must be individually calibrated, further adding to the complexity and cost of the measurement.

It has been determined that characteristic and temperature-dependent factors can be derived from measurements of the amount of light transmitted by many materials. When these materials are used in a temperature sensor, the sensor is subject to the sources of inaccuracy listed above. Surprisingly, however, the ratio of these factors depends only on the sensor material and the temperature. That is, $T=f(R)$, where T is the temperature, R is the ratio of the temperature-dependent and characteristic factors of the transmitted light, and $f(R)$ is a function characteristic of each material. When the temperature-dependent factor, the characteristic factor, and $f(R)$ are known, the temperature can readily be computed from the ratio R.

The temperature-dependent and characteristic factors are derived from measurements of the amount of light transmitted through a proposed sensor material, and the ratios R are computed in a manner to be described below. The measurements are carried out at a series of temperatures spanning the desired operating range of the sensor. The function $f(R)$ is determined by applying standard data analysis techniques to plots of T versus R. An unknown temperature can then be measured by computing R from measurements of the amount of light transmitted through a temperature probe containing a material with a known temperature function $f(R)$.

Figure 1:
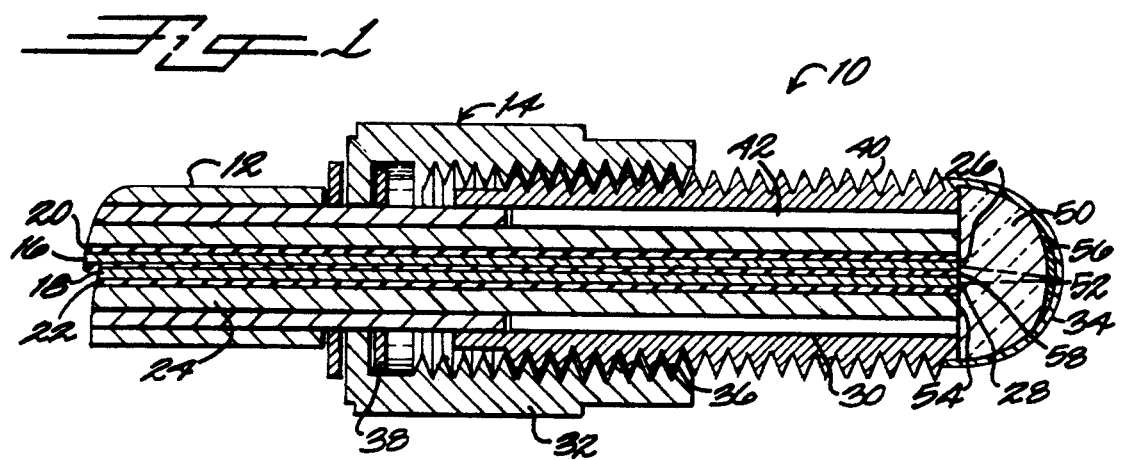
FIG. 1 is a cross-sectional view of a temperature probe according to a preferred embodiment of the present invention.

Referring now to FIG. 1, there is shown a cross-sectional view of an apparatus according to a preferred embodiment of the present invention. Temperature probe 10 comprises cable 12 and probe body 14. Cable 12 contains two optical fibers 16, 18 surrounded by inner sheaths 20, 22 and outer sheath 24. Fibers 16, 18 are a type of optical fiber well known in the art, having an inner core and a cladding that surrounds the core. Input fiber 16 is in optical communication with a light source (not shown); output fiber 18 is in optical communication with a detector such as a spectrophotometer (not shown). Ends 26, 28 of fibers 16, 18 terminate in plug 30.

Probe body 14 includes threaded bushing 32 and temperature sensor 34. Bushing 32 has threaded bore 36 therethrough, of sufficient diameter so that plug 30 passes readily through bore 36. Cable 12, bearing plug 30, is retained in bushing 32 by washer 38.

Temperature sensor 34 is mounted on threaded fitting 40. Fitting 40 has interior 42 sized to receive plug 30. Ends 26, 28 of fibers 16, 18 abut sensor 34 when fitting 40 is screwed into bushing 32, so that fibers 16, 18 are in optical communication with sensor 34.

Temperature sensor 34 has temperature-sensing element 50 and reflector 52. Element 50 has first surface 54 and opposing second surface 56. Reflector 52 adjoins second surface 56, and is preferably shaped to conform to surface 56. Reflector 52 is shaped to receive light from input fiber 16 and reflect that light to output fiber 18. Therefore, ends 26, 28 of optical fibers 16, 18 are preferably positioned at points symmetric to focal point 58 of reflector 52. Light carried by fiber 16 enters element 50 at first surface 56, traverses element 50, strikes reflector 52 and is reflected to end 28 of fiber 18. Reflector 52 and surface 56 may be approximately hemispherical, as shown, or some other configuration that effectively focuses light onto end 28 of output fiber 18. If desired, temperature-sensing element 50 may be placed in a closed, substantially optically-transparent chamber having a connector for a two-way fiber optic cable on one surface and a reflector 52 on an opposing surface. Preferably, element 50 has temperature-dependent optical transmission characteristics as described below.

Figure 2A:
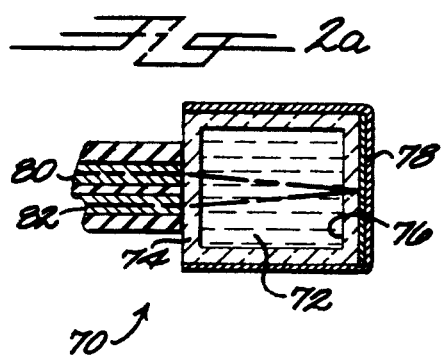
FIGS. 2A–2D are cross-sectional views of temperature sensors according to the present invention.

Temperature sensor 34 may assume a variety of specific configurations. By way of example, several alternative embodiments of a temperature sensor according to the present invention are illustrated in FIGS. 2A-2D. A sensor 70 includes fluid temperature-sensing element 72 contained in housing 74. Reflector 78 adjoins substantially flat rear 76 of housing 74 (FIG. 2A). Optical fiber 80 carries light that is reflected by reflector 78 onto fiber 82. Housing 74 is made of glass or some other material that is substantially transparent to light in the operational wavelength range of sensor 70.

Figure 2C:
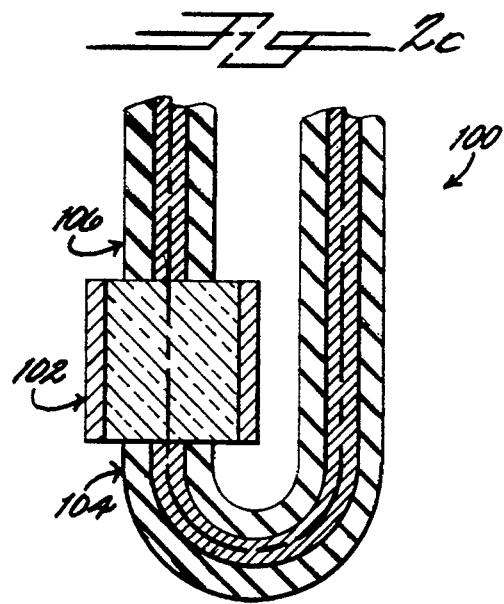
Figure 2B:
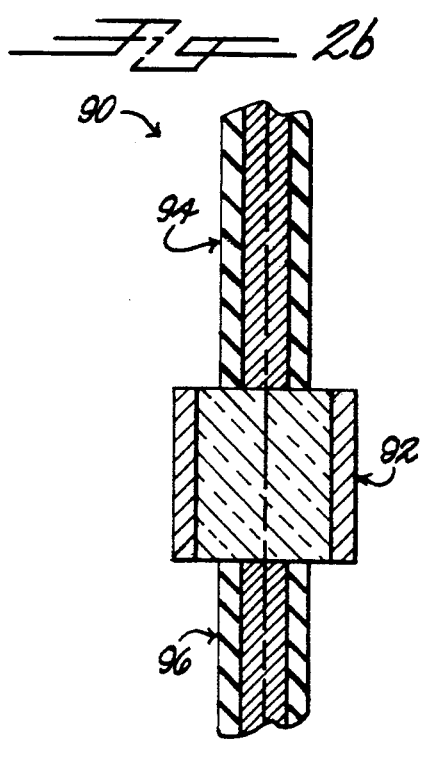

Alternatively, a sensor 90 has a temperature-sensing element 92 positioned in the light path between a substantially straight input fiber 94 and an output fiber 96 (FIG. 2B).

In still another embodiment, a sensor 100 has a temperature-sensing element 102 in optical communication with a bent fiber 104 and a straight fiber 106. Fiber 104 is curved near element 102 to facilitate installing sensor 100 in locations having limited access. Fiber 104 may be curved at an angle for the proposed application, including approximately 180° as shown in FIG. 2C. Either one of fibers 104, 106 may serve to transmit light from a source to sensor 100; similarly, either fiber may transmit light from sensor 100 to a detector.

Figure 2D:
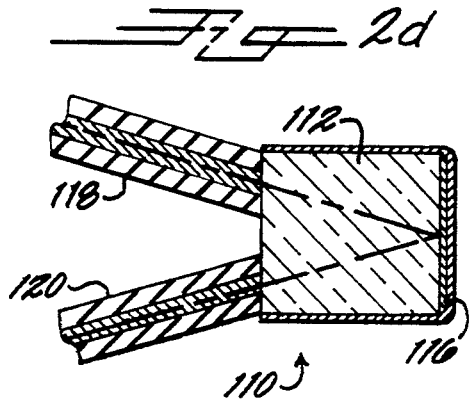

In yet another embodiment, a sensor 110 has a sensing element 112 with a reflector 116 receiving light from an input optical fiber 118 and transmitting reflected light to an output fiber 120 (FIG. 2D). Input and output fibers are angled to reflect light of planar reflector 116.

A temperature-sensing element according to the present invention has temperature-dependent light transmission properties in the desired temperature measurement range of probe 10. Temperature-sensing element 34 (as well as elements 72, 92, 102, and 112) may be any material adapted for use in the operating environment of probe 10. The material is one that has a known temperature function f(R) and transmits at least a portion of the light incident thereon. Preferably, the material has a temperature-dependent absorbance spectrum in a wavelength range characteristic of that material, and at least one isobestic wavelength within that range at which the transmitted light intensity is temperature-independent. Suitable materials include glass doped with rare earth ions such as neodymium or curopium in concentrations up to approximately 10 wt. %. High-surface-area glasses, such as glasses prepared by sol-gel processes, are suitable for use in probe 10. Suitable fluids for temperature-sensing element 72 of sensor 70 include mixtures of $D_2O$ and $H_2O$.

The optimum choice of materials for temperature probe 10 depends on the desired temperature range and the physical conditions expected at the probe location. Probe 10 may include some electrically-conducting and/or thermally-conducting materials. However, probe 10 is preferably made of substantially non-electrically-conducting materials to minimize electrical interference when used in electromagnetic fields. Probe 10 is preferably substantially non-thermally-conducting, to minimize thermal conduction away from the environment. For example, fiber sheaths 20,22 are fashioned of some flexible, impervious material such as TEFLON or the like. Plug 30 and probe body 14 may be stainless steel or plastic.

Figure 3:
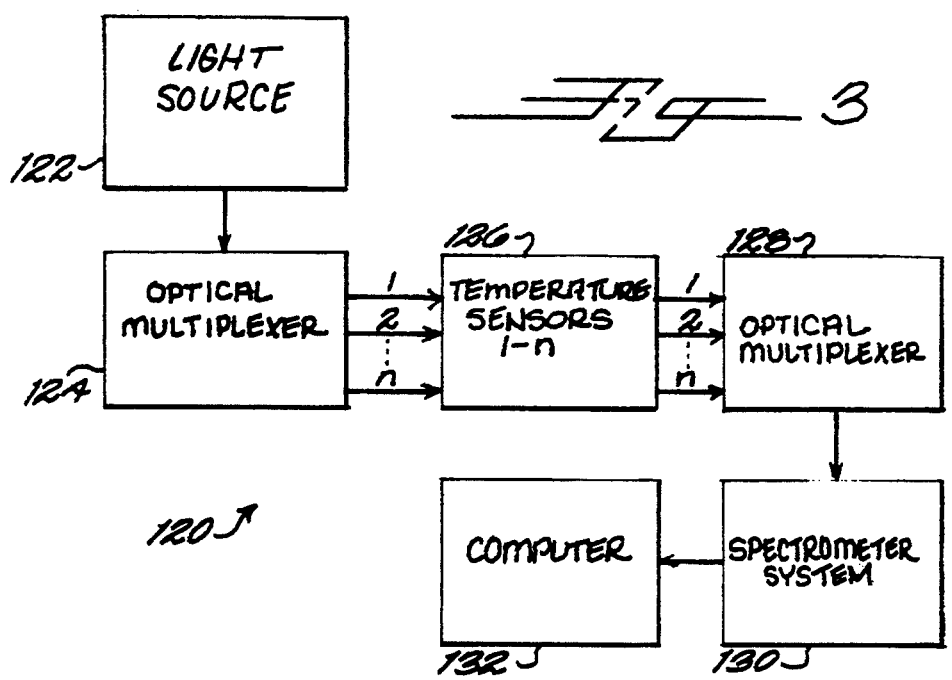
FIG. 3 is a schematic view of a temperature-measuring apparatus using the temperature probe of FIG. 1.

A schematic representation of a temperature-measuring apparatus according to the present invention is illustrated in FIG. 3. Apparatus 120 includes light source 122 and first optical multiplexer 124 for sending light to each of a series of temperature sensors 126 as described above. The light then is transmitted to a second optical multiplexer 128 that feeds the light to spectrophotometric system 130. A computer 132 in communication with spectrophotometric system 130 evaluates the resulting spectral data. Temperature sensors 126 are located in a region where the temperature is to be measured.

Source 122 is preferably a broad-band radiant energy source such as a quartz-halogen lamp or a light-emitting diode. When the temperature in the region is to be computed using Method II as described below, apparatus 120 will include a series of notch filters (not shown) or similar devices that are responsive to selected, narrow bands of wavelengths of light emitted by source 122. Spectrophotometer system 130 may then include a fast scan spectrophotometer and an analog-to-digital converter for digitizing the light signal received from source 122. The signal is digitized and sent to computer 132 for processing. Computer 132 uses a stored algorithm to process the digitized information and derive R to compute the temperature from temperature function f(R) of temperature sensors 126. The temperature may be displayed in any convenient manner, including visually and by recording using a printer/plotter, and may also activate an audio/visual alarm system.

The temperature function f(R) of element 50 (as seen in FIG. 1) is found by analyzing R as a function of temperature. As described above, R is the ratio of temperature-dependent and characteristic factors derived from measurements of the amount of light transmitted by the material of element 50 at a range of temperatures. The factors may be derived from the absorbance spectrum of the material (Method I), or from measurements at selected wavelengths (or narrow bands of wavelengths) chosen in a manner to be described below (Method II).

I. Absorbance Spectrum Method

Figure 4:
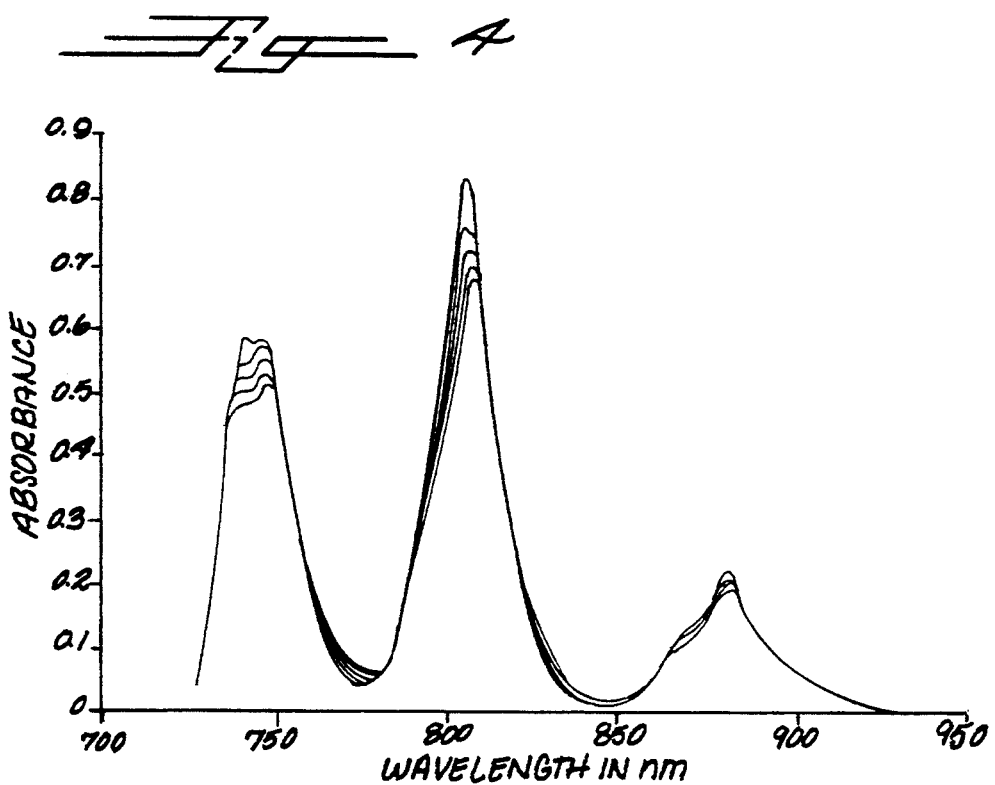
FIG. 4 is a graph of the absorbance of neodymium-doped glass at a series of temperatures.

The absorbance of temperature-sensing element 50 is defined as the logarithm of the ratio of the transmitted light intensity with temperature probe 10 in the light path between light source 122 and detector 124 to that of transmitted light intensity of a reference (without probe 10 in the light path). This ratio itself is not sufficiently accurate for measuring temperature due to various effects in the fiber optic cable and the effects of thermal expansion on the measurement. However, a suitable temperature-dependent ratio R can be derived from the absorbance spectrum of the material of element 50 generally as follows:

1. Measure the absorbance spectrum of the material at a range of temperatures to obtain S, a set of vectors that represents the absorbance spectra and their variations with temperature. The measurements preferably cover the proposed operating temperature range of the material. By way of example, the absorbance spectrum of a 2.5 mm thickness of borosilicate glass doped with approximately 4 wt. % neodymium was measured at temperatures ranging from 25° C. to 180° C. The absorbance spectrum is temperature-dependent, as seen in FIG. 4. The measured amplitudes of the three principal peaks (at wavelengths of about 750 nm, 810 nm, and 875 nm) decrease with increasing temperature.

Figure 5:
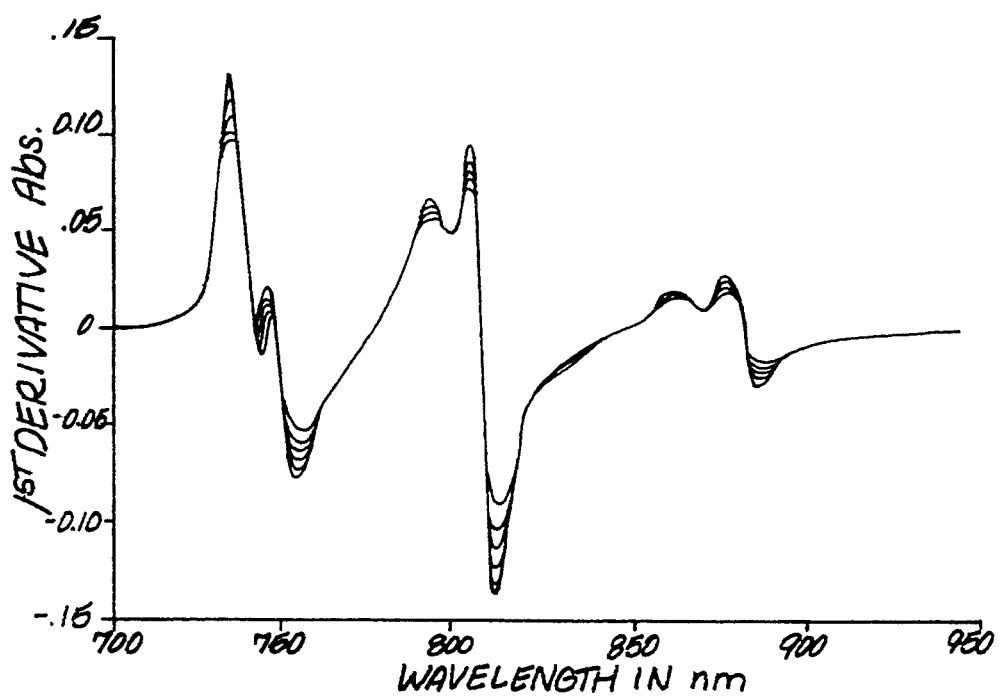
FIG. 5 is a graph of the first derivative of the absorbance of neodymium-doped glass at a series of temperatures.

2. Take the first derivative, S', of S. First derivatives of the absorbance spectra of FIG. 4 are shown in FIG. 5.

Figure 6:
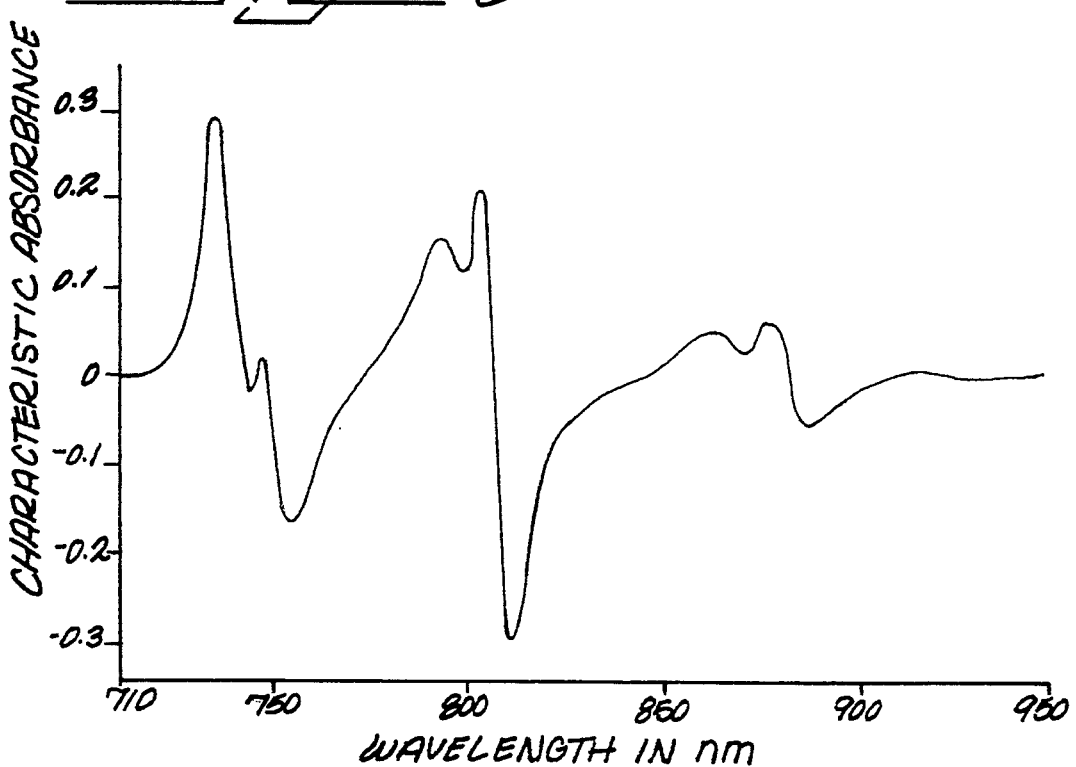
FIG. 6 is a graph of the first derivative of the characteristic absorbance ($C_1$) of neodymium-doped glass.
Figure 7:
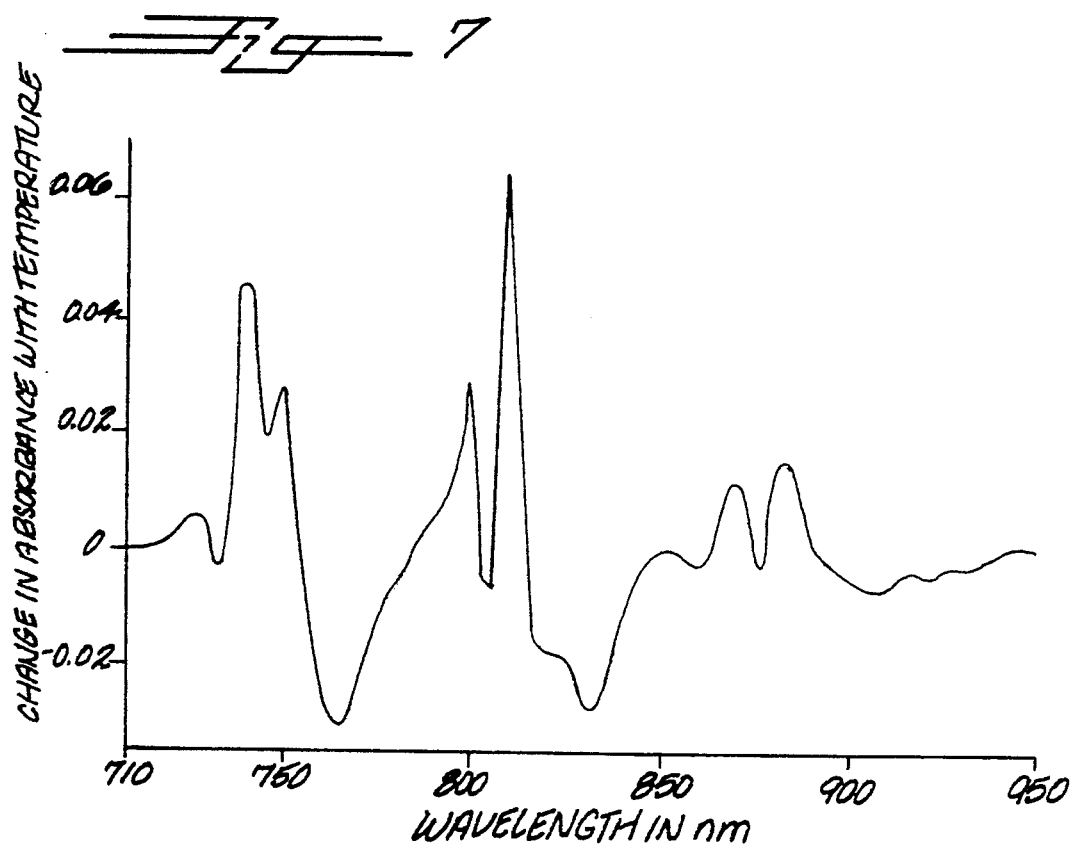
FIG. 7 is a graph of the temperature-dependent first derivative of the absorbance ($C_2$) of neodymium-doped glass.

3. Using Principal Component Regression (PCR), decompose the set of S' into two sets of vectors $C_1$ and $C_2$. The characteristic absorbance $C_1$ represents the weighted average of a series of measurements over a range of temperatures. The temperature-dependent function $C_2$ is a measure of the difference between each measurement and the weighted average. The functions $C_1$ and $C_2$ are characteristic for each material. Results for the spectra of FIG. 4 are shown in FIGS. 6 and 7.

4. Compute the dot products of S' with $C_1$ and with $C_2$:

$$E_1 = S' \cdot C_1$$

$$E_2 = S' \cdot C_2$$

5. Compute the absorbance ratio $R_{21} = E_2/E_1$. For neodymium-doped glass, $R_{21}$ is related to temperature by the quadratic equation $$T = AR_{21} + BR_{21}^2 + C,$$

where T is the temperature and A, B, and C are constants.

Figure 8:
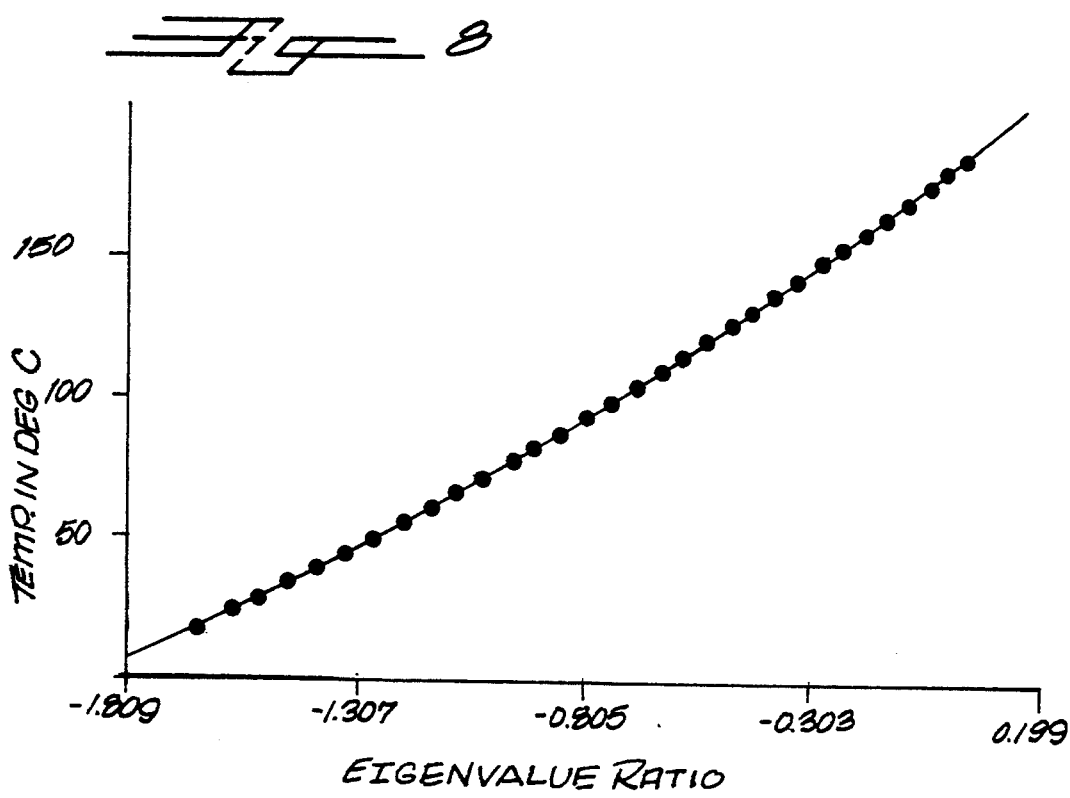
FIG. 8 is a graph of temperature versus the absorbance ratio (R) of neodymium-doped glass.

The constants A, B, and C are derived by a least squares fit of the computed values of $R_{21}$ versus temperature (FIG. 8). For the data of FIG. 8, A=707.3, B=799.5, and C=25.4.

Figure 9:
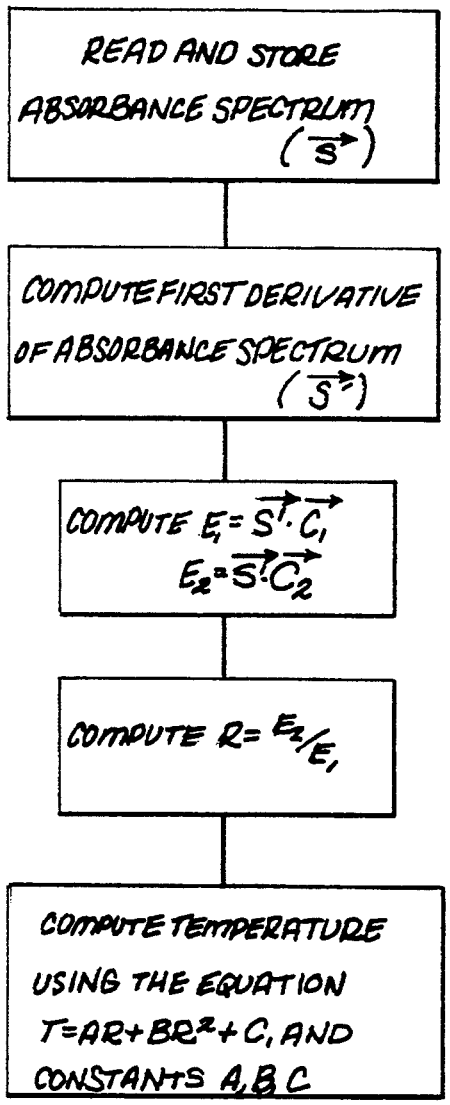
FIG. 9 is a flow chart of a first algorithm for determining the temperature using the method of the present invention.

Once the constants A, B, and C are known for the material, an unknown temperature can be found by the procedure shown in FIG. 9. The temperature is measured as follows:

1. Using a temperature probe such as probe 10 described above, position temperature-sensing element 50 in a region in which the temperature is to be measured. Element 50 is made of a material having a known temperature function f(R) and characteristics $C_1$ and $C_2$.

2. Measure the absorbance spectrum.

3. Compute the first derivative of the absorbance spectrum.

4. Compute $E_1$ and $E_2$.

5. Compute the absorbance ratio $R_{21} = E_2/E_1$.

6. Compute the temperature using the equation $T = AR_{21} + BR_{21}^2 + C$, where A, B, and C are known constants for the particular sensor material.

Neodymium-doped borosilicate glass can be used to measure temperature over an operating range of about $-196°$ C. to 400° C., accurate to $\pm 0.5°$ C. Optical fibers may be on the order of 1 mm in diameter or smaller; the above data were obtained using a glass wafer approximately 2.5 mm thick. It will be evident, therefore, that a temperature probe according to the present invention can be used to measure temperature in remote, or poorly-accessible locations.

Additional tests were carried out using a mixture of deuterium oxide ($D_2O$) and protium oxide ($H_2O$) contained in a glass housing according to the configuration shown in FIG. 2D. A mixture containing approximately 90 wt. % $D_2O$ and 10 wt. % $H_2O$ was accurate to $\pm 0.1°$ C. over an operating range of approximately 5° C. to 90° C. The temperature range of a $D_2O/H_2O$-based temperature probe according to the present invention is generally limited to temperatures less than approximately 500° C., as determined by the maximum pressure attainable inside the probe body.

Temperature is empirically related to the absorbance ratio of neodymium-doped glass by a quadratic equation. The temperature-dependence of other materials may assume a similar form, but with different constants A, B, and C and different temperature-dependent and characteristic functions for each particular material. The temperature-dependence of some materials may assume more complex forms, including higher-order equations or other types of equation such as an exponential series. Any light-transmitting material having an absorbance ratio $R_{21}$ that is related to temperature by a determinable function $f(R_{21})$ is within the spirit of the present invention. For ease in deriving $f(R_{21})$ and computing the temperature, useful sensor materials may preferably be such as exhibit relatively simple temperature-dependence.

II. Double Ratio Absorbance Method

A ratio that is a unique function of temperature for a particular material may be derived from measurements of the transmitted light intensity at three selected wavelengths. The material preferably absorbs light within a characteristic wavelength range. In addition, the material has at least one known isobestic wavelength, that is, a wavelength at which the transmitted intensity is known to be substantially independent of temperature over the desired operating temperature range of the sensor.

To determine the temperature-dependence of a particular material:

1. With the material at a known temperature, measure the transmitted light intensity at a first wavelength (or narrow band of wavelengths) outside the characteristic range. This value is $I_b$.

2. Measure the transmitted intensity at an isobestic wavelength. This value is $I_I$.

3. Measure the transmitted intensity at an analytic point, that is, a nonisobestic wavelength within the characteristic range, preferably a point where the intensity changes greatly with temperature. This value is designated $I_A$.

4. Compute the ratios $A_I = -\ln(I_I/I_b)$, $A_A = -\ln(I_A/I_b)$.

5. Compute the absorbance ratio $R_{AI} = A_A/A_I$.

6. For the neodymium-doped glass discussed above, $R_{AI}$ is related to temperature by the quadratic equation $$T = f(R_{AI}) = AR_{AI} + BR_{AI}^2 + C,$$

where T is the temperature and A, B, and C are constants. The constants A, B, and C can be determined by a least squares fit of $R_{AI}$ versus temperature, where the values of $R_{AI}$ are derived from a series of measurements at different temperatures.

Figure 10:
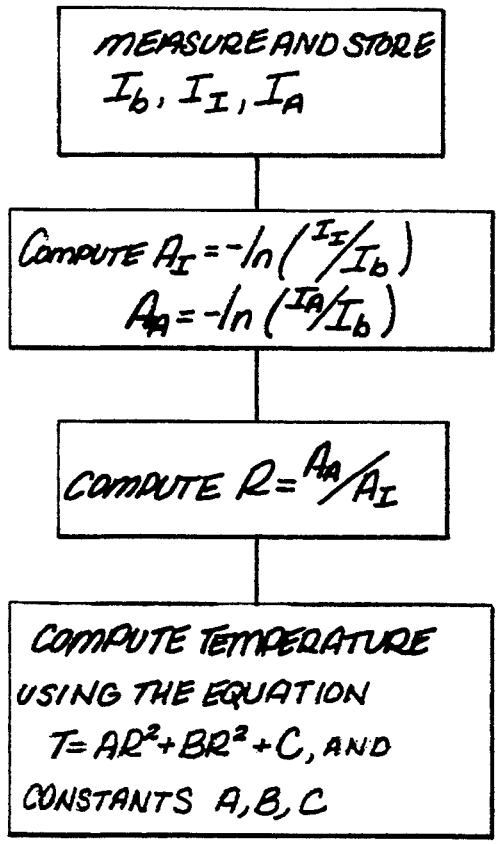
FIG. 10 is a flow chart of a second algorithm for determining the temperature.

The procedure for measuring an unknown temperature is illustrated in FIG. 10. The temperature is measured as follows:

1. Position the sensor in the desired region.

2. Measure the transmitted light intensity at a wavelength outside the characteristic range to find $I_b$.

3. Measure the transmitted intensity at an isobestic wavelength, $I_I$.

4. Measure the transmitted intensity at an analytic point, $I_A$.

5. Compute $A_I = -\ln(I_I/I_b)$, $A_A = -\ln(I_A/I_b)$, and $R_{AI} = A_A/A_I$.

6. Find T by computing $T = AR_{AI} + BR_{AI}^2 + C$, where A, B, and C are the constants previously determined for the sensor material.

If desired, the transmitted light intensity may be measured at two or more analytic wavelengths $I_A$. Each wavelength provides a separate determination of $R_{AI}$. This data allows for verification of the results for internal consistency and a more accurate determination of the temperature.

For the neodymium-doped glass described herein, temperature is related to the ratio $R_{AI}$ by a quadratic equation. As for the absorbance ratio $R_{21}$ discussed above, $R_{AI}$ for other materials may be related to temperature by similar quadratic equations with constants A, B, and C unique to each material. The temperature-dependence of some materials may be represented by higher-order linear equations, or exponential or other series. It is expected that the temperature-dependence of most potentially useful sensor materials will be adequately described by relatively low-order equations. For ease in determining $f(R_{AI})$ and computing the temperature from $R_{AI}$, useful sensor materials preferably are such as exhibit relatively simple temperature-dependence.

Once $f(R_{AI})$ is known for a proposed sensor material, a set of narrow-band, notch filters may be used to make the intensity measurements needed for a determination of $R_{AI}$. As is known in the art of optical measurements, a notch filter selectively transmits light in a predetermined, narrow band of wavelengths. Here, the wavelengths are chosen to match the appropriate wavelengths for $I_b$, $I_I$, and $I_A$. The filters may be used to selectively transmit light from light source 122 to temperature-sensing element 50, or selectively transmit light from element 50 to detector 124. Alternatively, a set of light sources may be used to transmit light to the temperature probe, each source generating light at a different wavelength (or narrow band of wavelengths).

A temperature probe used as described above is as accurate as presently-used devices, including thermocouples and fluorescent optic temperature probes. Since it is nonconducting, it is safer to use than devices having electrically-conducting components, and is not subject to electrical interference.

Because the response of temperature probe 10 is optical, not electrical, the signal is unaffected by stray electromagnetic fields or leakage currents. The ceramic or glass materials used in probe 10 do not conduct heat from the point being measured as quickly as metal probes, making the probe more accurate for measuring temperature in a process or material with low heat capacity.

The methods described above largely eliminate probe-to-probe variations due to materials, construction, geometry, and thermal expansion/contraction. Use of the methods eliminates the need to calibrate each probe individually, thereby saving the considerable time and expense incurred in individually calibrating probes. The temperature range and accuracy of a temperature probe according to the present invention can be optimized by careful selection of the temperature-sensitive materials used in the probe.

It will be apparent to those skilled in the art that many changes and substitutions can be made to the preferred embodiment herein described without departing from the spirit and scope of the present invention as defined by the appended claims.

What is claimed is:

1. A method for measuring temperature, said method for use with a source of light, a detector, and a temperature sensor having at least one isobestic wavelength, said sensor absorbing light in a temperature-dependent manner within a characteristic wavelength range, said method comprising the steps of:

transmitting light from said light source through said temperature sensor to said detector;

measuring the intensity $I_b$ of light transmitted through said sensor at a first wavelength, said first wavelength being outside said characteristic wavelength range;

measuring the intensity $I_I$ of light transmitted through said sensor at said isobestic wavelength;

measuring the intensity $I_A$ of light transmitted through said sensor at an analytic wavelength, said analytic wavelength being within said characteristic wavelength range;

computing the quantities $A_I = -\ln(I_I/I_b)$ and $A_A = -\ln(I_A/I_b)$;

computing the ratio $R_{AI} = A_A/A_I$; and computing said temperature, whereby said temperature may be determined from a function of said ratio, said function formed by (a) while maintaining said sensor at a known temperature, measuring said intensity $I_b$, measuring said intensity $I_I$, and measuring said intensity $I_A$, (b) computing said quantities $A_I$ and $A_A$ from said measurement at said known temperature.

(c) computing said ratio $R_{AI}$, (d) repeating steps (a) through (c) with said sensor maintained at different known temperatures to produce a plurality of temperature measurements and a plurality of ratio measurements, and (e) obtaining said function by correlating said pluralities of temperature and ratio measurements.

2. The method as recited in claim 1, further comprising the step of passing said transmitted light through a filter, said filter selectively transmitting light at said first wavelength, said isobestic wavelength, and said analytic wavelength.

3. The method as recited in claim 1, further comprising the initial step of passing light from said source through a filter, said filter selectively transmitting light at said first wavelength, said isobestic wavelength, and said analytic wavelength.

4. The method as recited in claim 1, wherein said temperature is approximately related to said ratio $R_{AI}$ by the equation $T=AR_{AI}+BR_{AI}^2+C$, wherein the quantities A, B and C are constants for said sensor, and wherein said function-obtaining step further comprises determining said quantities A, B and C from said pluralities of temperature and ratio measurements.

5. A temperature probe for use with a source of light and a detector, said probe comprising:
a temperature sensor having
a substantially optically-transparent housing, and
a mixture of $D_2O$ and $H_2O$ contained within said housing,
said sensor transmitting at least a portion of the light incident thereon in relation to the temperature of said sensor, said transmitted light having a characteristic factor and a temperature-dependent factor, the ratio of said temperature-dependent factor to said characteristic factor being a known function of temperature;
first means for transmitting light from said source to said temperature sensor; and
second means for transmitting light from said temperature sensor to said detector.

6. The temperature probe as recited in claim 5 wherein said first light-transmitting means further comprises a first optical fiber, and said second light-transmitting means further comprises a second optical fiber, wherein said temperature sensor has a substantially flat surface and opposing curved surface, and wherein said probe further comprises
a reflector positioned adjacent to said curved surface so that light entering said sensor from said first optical fiber is reflected by said reflector to said second optical fiber.

7. The temperature probe as recited in claim 5, wherein said mixture has at least one isobestic wavelength, said mixture absorbing light in a temperature-dependent manner within a characteristic wavelength range, further comprising a filter, said filter selectively transmitting light at said isobestic wavelength, a base wavelength, and an analytic wavelength, said base wavelength being outside said characteristic range and said analytic wavelength being within said characteristic range.

8. The temperature probe as recited in claim 5 wherein said first light-transmitting means further comprises an optical fiber, said fiber having a first end in optical communication with said source and a second end in optical communication with said temperature sensor, said fiber bent near said second end at an angle of approximately 180°.

9. The temperature probe as recited in claim 5, wherein said second light-transmitting means further comprises an optical fiber, said fiber having a first end in optical communication with said temperature sensor and a second end in optical communication with said detector, said fiber bent near said first end at an angle of approximately 180°.

10. The temperature probe as recited in claim 5, wherein said mixture contains approximately 90 wt. % $D_2O$ and approximately 10 wt. % $H_2O$.

11. A method for measuring temperature in a region, said method comprising the steps of:
transmitting light through a temperature sensor located in said region, said sensor absorbing a portion of said light in relation to the temperature of said sensor;
measuring the intensity of said light transmitted through said temperature sensor, said transmitted light having a characteristic factor and a temperature-dependent factor, the ratio of said temperature-dependent factor to said characteristic factor being a known function of temperature, said function found by
(a) measuring the intensity of light transmitted through said sensor at a known temperature,
(b) computing said characteristic factor and said temperature-dependent factor from said measurement,
(c) computing the ratio of said temperature-dependent factor to said characteristic factor,
(d) repeating steps (a) through (c) with said sensor maintained at different known temperatures to produce a plurality of temperature measurements and a plurality of ratio measurements, and
(e) obtaining said function by correlating said pluralities of temperature and ratio measurements;
computing said temperature-dependent factor;
computing said characteristic factor;
computing said ratio of said temperature-dependent factor to said characteristic factor; and
computing said temperature using said ratio and said function.

12. The method as recited in claim 11, wherein said sensor absorbs light in a temperature-dependent manner within a characteristic wavelength range and absorbs light in a temperature-independent manner at an isobestic wavelength, wherein said measuring step further comprises:
measuring the intensity $I_b$ of light transmitted through said sensor at a first wavelength, said first wavelength being outside said characteristic wavelength range;
measuring the intensity $I_I$ of light transmitted through said sensor at said isobestic wavelength;
measuring the intensity $I_A$ of light transmitted through said sensor at an analytic wavelength, said analytic wavelength being within said characteristic wavelength range; and
wherein said ratio-determining step further comprises computing the ratio $R_{AI}=A_A/A_I$, where $A_A=-\ln(I_A/I_b)$ and $A_I=-\ln(I_I/I_b)$.

13. The method as recited in claim 12, wherein said temperature is approximately related to said ratio $R_{AI}$ by the equation $T=AR_{AI}+BR_{AI}^2+C$, wherein the quantities A, B and C are constants for said sensor, and wherein said function-obtaining step further comprises determining said quantities A, B and C from said pluralities of temperature and ratio measurements.

14. The method as recited in claim 12 wherein said temperature is approximately related to said ratio $R_{AI}$ by the equation $T = AR_{AI} + BR_{AI}^2 + C$, wherein the quantities A, B and C are constants for said sensor, and wherein said function-obtaining step further comprises determining said quantities A, B and C from said pluralities of temperature and ratio measurements; and wherein said temperature-computing step farther comprises computing said temperature from said equation.

15. The method as recited in claim 11, wherein said measuring step further comprises measuring the absorbance spectrum of said sensor, and wherein said ratio-computing step further comprises:

computing the first derivative S' of said absorbance spectrum;

separating said first derivative into a characteristic absorbance $C_1$ and a temperature-dependent absorbance $C_2$;

computing the quantities $E_1 = S' \cdot C_1$ and $E_2 = S' \cdot C_2$; and computing the ratio $R_{21} = E_2/E_1$.

16. The method as recited in claim 14, wherein said temperature is approximately related to said ratio $R_{21}$ by the equation $T = AR_{21} + BR_{21}^2 + C$, wherein the quantities A, B and C are constants for said sensor, and wherein said function-obtaining step further comprises determining said quantities A, B and C from said pluralities of temperature and ratio measurements.

17. The method as recited in claim 14, wherein said temperature is approximately related to said ratio $R_{21}$ by the equation $T = AR_{21} + BR_{21}^2 + C$, wherein the quantities A, B and C are constants for said sensor, and wherein said function-obtaining step further comprises determining said quantities A, B and C from said pluralities of temperature and ratio measurements; and wherein said temperature-computing step further comprises computing said temperature from said equation.

18. The method as recited in claim 11, wherein said transmitting step further comprises transmitting said light through a sensor made of rare earth-doped glass.

19. The method as recited in claim 11, wherein said transmitting step further comprises transmitting said light through a sensor made of neodymium-doped glass.

20. The method as recited in claim 11, wherein said transmitting step further comprises transmitting said light through a fluid sensor, said sensor including a mixture of $D_2O$ and $H_2O$.

* * * * *